(No Model.) 2 Sheets—Sheet 1.
E. J. HAGAN.
SULKY CHECK ROW CORN PLANTER.
No. 279,241. Patented June 12, 1883.
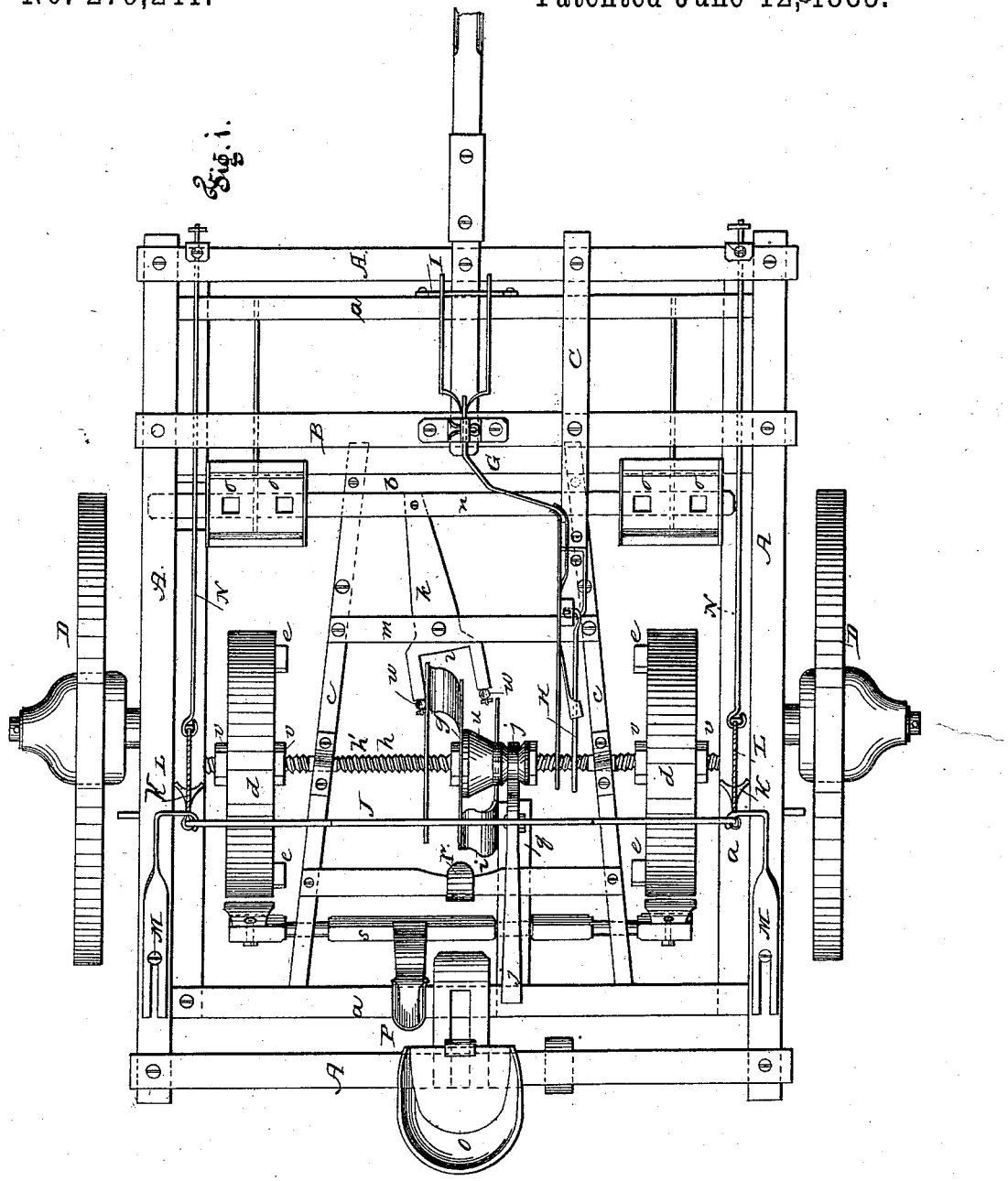
WITNESSES:
INVENTOR.
Elijah J. Hagan
By Isaac T. Gibson & ATTORNEYS.

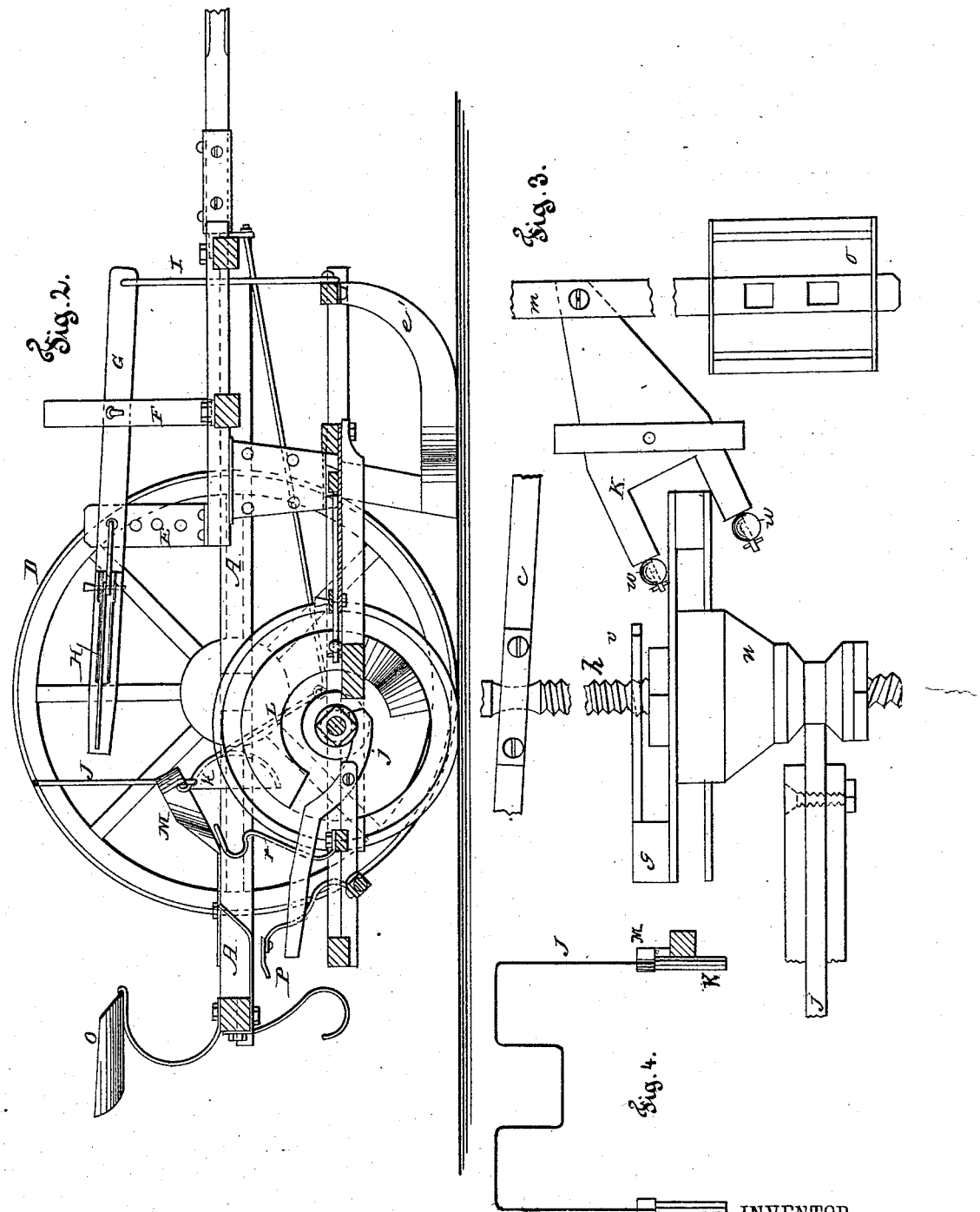

UNITED STATES PATENT OFFICE.

ELIJAH J. HAGAN, OF WILLOW TOWNSHIP, GREENE COUNTY, IOWA.

SULKY CHECK-ROW CORN-PLANTER.

SPECIFICATION forming part of Letters Patent No. 279,241, dated June 12, 1883.

Application filed June 8, 1882. (No model.)

*To all whom it may concern:*

Be it known that I, ELIJAH J. HAGAN, a citizen of the United States, residing in Willow township, Greene county, Iowa, post-office address Bayard, in the county of Guthrie and State of Iowa, have invented certain new and useful Improvements in Sulky Check-Row Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The chief objects in my improvement consist in combining a sulky and corn-planter of simple and durable construction with appliances conveniently arranged for regulating the depth of planting and correcting the drop and securing perfection in the check-rows. The construction lightens the draft, eases the turning and the backing, and improves the safety and convenience in transporting planters from one field to another. I attain these objects by the mechanism illustrated in the accompanying drawings, in which—

Figure 1 is a top view of the machine. Fig. 2 is a vertical longitudinal section. Figs. 3 and 4 are detached views.

Referring to the accompanying drawings, Fig. 1, letter A designates the sulky-frame, under which is the planter-frame $a$. The planter is attached to the sulky by means of connecting-rods N, the cords or chains L, and clevis I. The planter can be raised and entirely suspended from the ground by the driver, in his seat O, drawing toward him the double elbow-lever L, and he can secure the suspension by placing the lever L in hook or holder $r$.

$h$ represents a revolving axle having a right and left hand screw-thread, $h'$. On this axle is secured and adjusted by nuts $v$ the two followers $d$ and the cam-hub $n$, the flanges or cam $i$ operating the forked lever $k$, the opposite end of said lever being inserted or connected in or to the slide $u$, which, with proper seed-cups in the boxes $o$, regulates the time of dropping and the amount of seed planted in each hill.

The single lever G, Fig. 2, being connected with the planter-frame $a$ by the clevis I, the driver can raise or lower the planter, and thus regulate the depth of planting at pleasure.

Two flanges, $i$, are used in planting check-rows, but a greater number in drilling.

The followers or coverers which follow the runners $e'$ have two or more markers, $e$, attached to their periphery, and are arranged to indicate the spot in the furrow made by the runners $e'$ where each hill of corn has been dropped. If the markers indicate the drop to be too soon when compared with the marks on the last row planted, the driver will use the lever-brake $j$ on the hub $w$ of the cam $g$ with his foot to retard the motion until the mark is corrected. If the mark is too slow, the driver should raise the planter by means of the double elbow-lever J, then back the sulky until the mark is correct.

At the ends of the rows the planter should be raised or suspended while turning, and also while being transported from one field to another. The other portions of the sulky which form a part of this description are indicated by the following characters: B, the middle cross-bar; C, the brace; D, the wheels; E and F, the standards; M, the adjustable stops or checks; P, the driver's foot-rest. The other portions of the planter which form a part of this description are indicated by the following characters: $b$, the middle cross-bar; $c$, the oblique bars; $d$, the coverers or followers; $m$, the pivot-bar; $s$, the double brake; $q$, the brace; $v$, the axle-nuts; $w$, the anti-friction balls.

Having fully described my invention, what I desire to claim, and secure by Letters Patent, is—

1. A sulky check-row corn-planter having frame $a$, provided with oblique bars $c$ $c$ and axle $h$, said axle journaled in said frame, and cross-bars, link I, chains or ropes L L, and hook $r$, combined with frame A, having single hand-lever G, pivoted to standard F on cross-bars B, double elbow-lever J, pivoted on the side bars of frame A and provided with quadrants K K, substantially as and for the purposes set forth.

2. In a check-row corn-planter, frame A, provided with sulky-carrying wheels D D, in combination with frame $a$, provided with axle $h$, having right and left screw-thread $h'$ and coverers $d\ d$, substantially as and for the purposes set forth.

3. The combination, in a sulky check-row corn-planter, of the foot-roller brake $s$, coverers $d\ d$, markers $e\ e$, foot-lever brake $j$, pivoted centrally in frame $a$, cam $g$, and axle $h$, having right and left screw-thread, substantially as and for the purposes set forth.

4. In a sulky check-row corn-planter, frame $a$, provided with chains or ropes L L, secured to the side bars of said frame, and hook $r$, combined with frame A, provided with movable checks M M, double elbow-lever J, pivoted on the side bars of said frame, and provided with quadrants K K, substantially as and for the purposes set forth.

5. In a corn-planter, the axle $h$, journaled in the frame $a$, and having cut thereon a right and left hand screw-thread, $h'$, said axle revolving with the coverers $d\ d$, combined with the nuts $v$, by means of which the cam $g$, coverers $d\ d$, with their markers $e\ e$, can be readily adjusted and firmly secured to said axle, substantially as and for the purposes set forth.

6. In a corn-planter, the foot-lever brake $j$, pivoted centrally in frame $a$ and bearing upward on cam-hub, combined with cam $g$, adjustable midway between coverers $d\ d$ on the axle $h$ by means of the nuts $v$, substantially as and for the purposes set forth.

7. In a corn-planter, the cam $g$, adjustable between coverers $d\ d$ on the axle $h$ by means of the nuts $v$, combined with the lever $k$, provided with friction-balls $w\ w$, and the slide $u$, substantially as and for the purposes set forth.

In testimony whereof I affix my signature in presence of two witnesses.

ELIJAH J. HAGAN.

Witnesses:
THOS. J. ANTHONY,
ISAIAH STOFER.